(12) United States Patent
Tanaka

(10) Patent No.: US 6,343,010 B1
(45) Date of Patent: Jan. 29, 2002

(54) APPARATUS AND SYSTEM FOR COOLING A PORTABLE DEVICE

(75) Inventor: Hironori Tanaka, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/432,387

(22) Filed: Nov. 2, 1999

(30) Foreign Application Priority Data

Nov. 4, 1998 (JP) .......................................... 10-313777

(51) Int. Cl.[7] ................................................ H05K 7/20
(52) U.S. Cl. .................... 361/687; 361/690; 361/694; 361/695; 361/697; 165/104.33
(58) Field of Search ................................ 361/687, 676, 361/678–695, 697; 257/718, 719, 722, 727; 174/15.2, 16.3; 165/80.3, 104.33, 185

(56) References Cited

U.S. PATENT DOCUMENTS

| | | | | |
|---|---|---|---|---|
| 4,744,005 A | * | 5/1988 | Milani ........................ | 361/384 |
| 5,095,404 A | * | 3/1992 | Chao .......................... | 361/385 |
| 5,424,913 A | * | 6/1995 | Swindler .................... | 361/687 |
| 5,430,609 A | * | 7/1995 | Kikinis ....................... | 361/687 |
| 5,557,500 A | * | 9/1996 | Baucom et al. ............ | 361/687 |
| 5,562,410 A | * | 10/1996 | Sachs et al. ............. | 415/213.1 |
| 5,704,212 A | * | 1/1998 | Erler et al. ................. | 62/3.2 |
| 5,768,102 A | * | 6/1998 | Ma ............................. | 361/695 |
| 5,884,049 A | * | 3/1999 | Atkinson .................... | 395/281 |
| 5,898,569 A | * | 4/1999 | Bhatia ....................... | 361/700 |
| 5,930,110 A | | 7/1999 | Nishigaki et al. | |
| 5,959,836 A | * | 9/1999 | Bhatia ........................ | 361/687 |
| 5,974,556 A | * | 10/1999 | Jackson et al. ............ | 713/322 |
| 6,172,871 B1 | * | 1/2001 | Holung et al. ............. | 361/687 |

FOREIGN PATENT DOCUMENTS

| | | | | |
|---|---|---|---|---|
| JP | 5108206 | 4/1993 | | |
| JP | 7-302136 | 11/1995 | | |
| JP | 7-311632 | 11/1995 | | |
| JP | 9034590 | 2/1997 | | |
| JP | 86-299854 | 3/1997 | | |
| JP | 9-198483 | 7/1997 | | |
| JP | 86-310388 | 7/1997 | | |
| JP | 3044579 | 10/1997 | | |
| JP | 3046009 | 11/1997 | | |
| JP | 10-23086 | 1/1998 | | |
| JP | 10-11175 | 4/1998 | | |
| JP | 10-133777 | 5/1998 | | |
| JP | 10-207572 | 8/1998 | | |
| JP | 10-238980 | 10/1998 | | |
| JP | 11-163567 A | * | 6/1999 | ............ H05K/7/20 |
| JP | 11-219235 | 8/1999 | | |

* cited by examiner

Primary Examiner—Leo P. Picard
Assistant Examiner—Anatoly Vortman
(74) Attorney, Agent, or Firm—Foley & Lardner

(57) ABSTRACT

Provided is a system for cooling a portable comprising: the portable and an apparatus for cooling the portable; wherein the portable comprises: a substrate; a heat source mounted on the substrate; a heat dissipation plate which is disposed beneath the substrate; a sheet which is thermally conductive, not electrically conductive, and sandwiched between the substrate and the heat dissipation plate; and an aperture which exposes the heat dissipation plate to external; and wherein the apparatus comprises: a thermally conductive material which is exposed to outside through a surface of the apparatus to contact with the heat dissipation plate when the portable is mounted on the apparatus; and a fan which contacts with the conductive material and dissipates heat from the thermally conductive material to ambience.

11 Claims, 3 Drawing Sheets

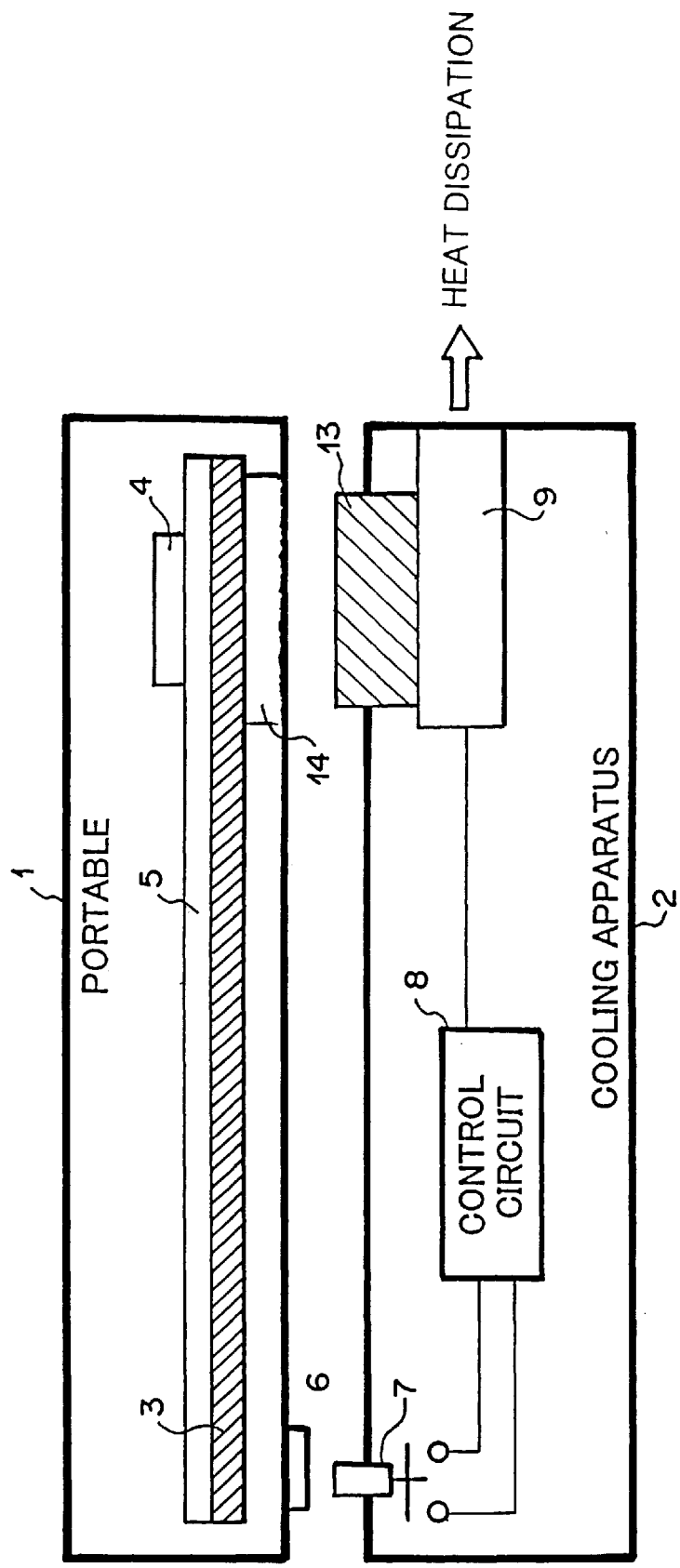

APPARATUS AND SYSTEM FOR COOLING A PORTABLE DEVICE

BACKGROUND OF THE INVENTION

1. Field of the Invention

The present invention relates to an apparatus and system for cooling a portable device such as a notebook computer.

2. Description of the Prior Art

Heretofore, because there has not been parts or apparatuses which drastically dissipate the heat generated in a portable such as a notebook computer, the heat generated in the portable was usually dissipated through a bottom surface of the portable device to a desk or the like. However, such dissipation was not effective.

SUMMARY OF THE INVENTION

In order to overcome the aforementioned disadvantages, the present invention has been made and accordingly, has an object to provide an apparatus and system for cooling a portable device which effectively dissipates the heat generated in a portable.

According to a first aspect of the present invention, there is provided an apparatus for cooling a portable device comprising: a thermally conductive material which is exposed to outside through a surface of the apparatus; and a fan which contacts with the conductive material and dissipates heat from the thermally conductive material to ambience.

According to a second aspect of the present invention, there is provided a portable device comprising: a substrate; a heat source mounted on the substrate; a heat dissipation plate which is disposed beneath the substrate; a sheet which is thermally conductive, not electrically conductive, and sandwiched between the substrate and the heat dissipation plate; and an aperture which exposes the heat dissipation plate to external.

According to a third aspect of the present invention, there is provided a system for cooling a portable device comprising: the portable device and an apparatus for cooling the portable device; wherein the portable device comprises: a substrate; a heat source mounted on the substrate; a heat dissipation plate which is disposed beneath the substrate; a sheet which is thermally conductive, not electrically conductive, and sandwiched between the substrate and the heat dissipation plate; and an aperture which exposes the heat dissipation plate to external; and wherein the apparatus comprises: a thermally conductive material which is exposed to outside through a surface of the apparatus to contact with the heat dissipation plate when the portable device is mounted on the apparatus; and a fan which contacts with the conductive material and dissipates heat from the thermally conductive material to ambience.

These and other objects, features and advantages of the present invention will become more apparent in the light of the following detailed description of the best mode embodiments thereof, as illustrated in the accompanying drawings.

BRIEF DESCRIPTION OF THE DRAWINGS

FIG. 1 is a conceptual diagram showing a structure of a portable device and cooling apparatus according to a first embodiment of the present invention;

DETAILED DESCRIPTION OF THE PREFERRED EMBODIMENTS

Figure 2A:
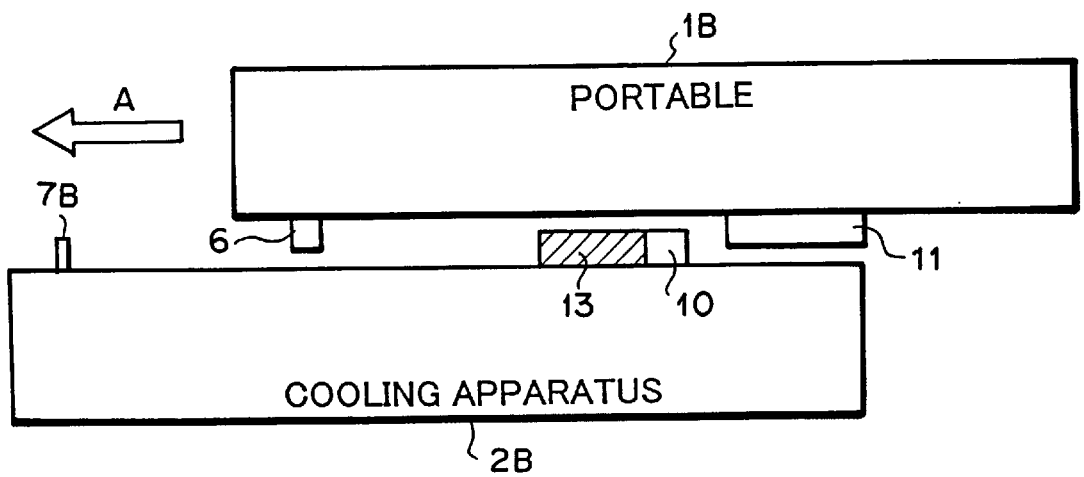
FIG. 2 is a conceptual diagram showing a structure of a portable device and cooling apparatus according to a second embodiment of the present invention.

Preferred modes of embodiment according to the present invention will be described with reference to the accompanying drawings.

[A First Embodiment]

Referring to FIG. 1, portable device 1 comprises substrate 5 such as a printed circuit board, heat dissipation plate 3 which is disposed beneath substrate 5 and composed of a thermally conductive material, heat source 4 such as a CPU mounted on substrate 5, projection 6 projecting downward from the bottom of portable device 1, and aperture 14 which exposes heat dissipation plate 3. A thermally conductive rubber sheet which is not electrically conductive may be sandwiched between substrate 5 and dissipation plate 3 to prevent short-circuits between substrate 5 and dissipation plate 3. Cooling apparatus 2 (or an apparatus for a cooling portable device 1) comprises detection switch 7 which detects whether or not portable device 1 is mounted on cooling apparatus 2, thermally conductive material 13 which is exposed to outside through a top surface of portable device 1 and conducts the heat from heat dissipation plate 3 to fan 9, fan 9 which contacts with thermally conductive material 13 and dissipates the heat from thermally conductive material 13 to ambience, and control circuit 8 which makes fan 9 operate when detection switch 7 detects that portable device 1 is mounted on cooling apparatus 2. Detection switch 7 may be of an A-type connection or a B-type connection.

Next, the operation of cooling apparatus 2 will be explained.

When portable device 1 is mounted on cooling apparatus 2, projection 6 changes the connection of detection switch 7, and accordingly control circuit 8 makes fan 9 operate, and in addition, heat dissipation plate 3 contacts with thermally conductive material 13. Therefore, the heat generated in heat source 4 flows to ambience through substrate 5, heat dissipation plate 3, thermally conductive material 13, and fan 9.

[A Second Embodiment]

Referring to FIG. 2, the difference of portable device 1B from portable device 1 is that portable device 1 B comprises slidable lid 11. Portable device 1B comprises all the members of portable device 1. The difference of cooling apparatus 2B from cooling apparatus 2 is that switch 7 is replaced by switch 7B which changes connection with horizontal movement and projection 10 is mounted besides thermally conductive material 13. Other members are the same between cooling apparatus 2 and cooling apparatus 2B.

Figure 2B:
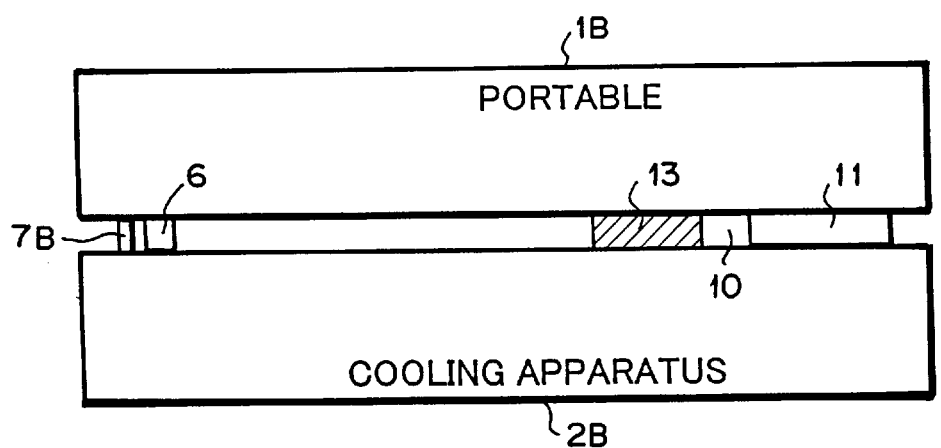
Figure 3:
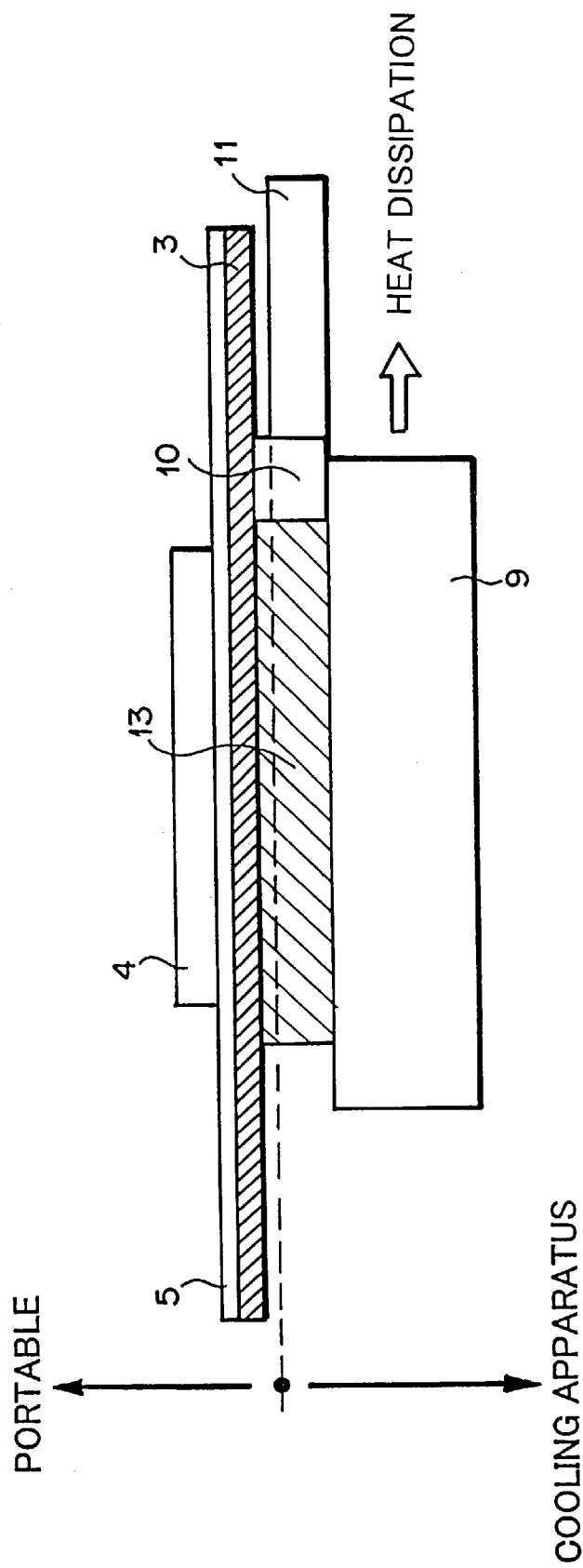
FIG. 3 is a enlarged partial cross sectional view showing the connection between the portable device and cooling apparatus according to the second embodiment of the present invention.

Portable device 1B and cooling apparatus 2B have the relative position as shown in FIG. 2A just before portable device 1B is mounted on cooling apparatus 2B. Thereafter, portable device 1B slides along arrow A, slidable lid 11 is slid rightward with respect to the body of portable device 1B by the abutment with projection 10, and projection 6 changes the connection of detection switch 7B as shown in FIG. 2B. At this time, aperture 14 emerges, heat dissipation plate 3 contacts with heat conductive material 13 as shown in FIG. 3, and control circuit 8 makes fan 9 operate. Therefore, at this time, heat generated in heat source 4 flows to ambience through substrate 5, heat dissipation plate 3, thermally conductive material 13, and fan 9.

[A Third Embodiment]

Cooling apparatuses 2 and 2B may further comprise other interfaces with portable devices 1 and 1B, respectively, such as a PCI bus, and a ISA bus, interfaces with the external such as a parallel interface, a serial interface, a USB interface, a PS/2 interface, and the like, and a circuit which converts the signals of the interface with portable devices 1 and 1 B to the signals of the interfaces with the external and vice versa. When apparatuses 2 and 2B comprise such interfaces, apparatuses 2 and 2B is also used as means for extending functions of portable devices 1 and 1B. Cooling apparatuses 2 and 2B which are used, for example, in an office may comprise all of the parallel interface, the serial interface, the USB interface, and the PS/2 interface, while cooling apparatuses 2 and 2B which are used, for example, out of the office may comprise some of the parallel interface, the serial interface, the USB interface, and the PS/2 interface.

As explained above, according to the present invention, because the heat generated in the heat source such as a CPU is dissipated from the FAN through the substrate, the heat dissipation plate, the heat conductive material, the heat source can be cooled with high conductivity.

In addition, according to the present invention, because the aperture is concealed with a slidable lid when the portable is not mounted on the cooling apparatus, the portable is protected from damage.

Further, according to the present invention, because the projection beneath the portable device changes the connection of the detection switch, a user of the portable device need not make the FAN in the operation manually when the portable device is mounted on the cooling apparatus.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. An apparatus for cooling a portable device, the apparatus being external to the portable device, comprising:
   a thermally conductive material which extends through a surface of a housing of the apparatus for physical contact with said portable device; and
   a fan which dissipates heat from said thermally conductive material to ambience when said thermally conductive material contacts said portable device.

2. The apparatus according to claim 1 further comprising:
   a switch which detects whether said portable device is mounted on the apparatus; and
   a circuit which operates said fan when said switch detects that said portable device is mounted on the apparatus.

3. The apparatus according to claim 1 further comprising:
   a projection which is disposed on said surface and beside said heat conductive material.

4. A portable device comprising:
   a substrate;
   a heat source mounted on said substrate;
   a heat dissipation plate which is disposed beneath said substrate;
   a sheet which is thermally conductive, not electrically conductive, and sandwiched between said substrate and said heat dissipation plate; and
   an aperture which exposes said heat dissipation plate to external.

5. The portable device according to claim 4 further comprising:
   a projection for changing a connection of a switch when the portable device is mounted on an apparatus for cooling;
   wherein the switch detects whether said portable device is mounted on the apparatus.

6. The portable device according to claim 5 further comprising:
   a slidable lid which conceals said aperture when the portable device is not mounted on an apparatus for cooling and is slid by said projection of the apparatus to expose said heat dissipation plate through said aperture when the portable device is mounted on the apparatus.

7. The portable device according to claim 4, wherein the portable device is a notebook computer.

8. A system and apparatus for cooling a portable device comprising:
   the portable device which comprises:
      a substrate;
      a heat source mounted on said substrate;
      a heat dissipation plate which is disposed beneath said substrate;
      a sheet which is thermally conductive, not electrically conductive, and sandwiched between said substrate and said heat dissipation plate; and
      an aperture which exposes said heat dissipation plate to external; and
   wherein the apparatus comprises:
      a thermally conductive material which is exposed to outside through a surface of the apparatus to contact with said heat dissipation plate when the portable device is mounted on the apparatus; and
      a fan which contacts with said conductive material and dissipates heat form said thermally conductive material to ambience.

9. The system according to claim 8,
   wherein the apparatus further comprises:
      a switch which detects whether the portable device is mounted on the apparatus; and
      a circuit which operates said fan when said switch detects that the portable device is mounted on the apparatus, and
   wherein the portable device further comprises a projection which changes a connection of said switch when the portable device is mounted on the apparatus.

10. The system according to claim 8,
    wherein the apparatus further comprises a projection which is disposed on said surface and beside said head conductive material; and
    wherein the portable device further comprises a slidable lid which conceals said aperture when the portable device is not mounted on the apparatus and is slid by said projection of the apparatus to expose said heat dissipation plate through said aperture when the portable device is mounted on the apparatus.

11. The system according to claim 8, wherein the portable device is a notebook computer.

* * * * *